United States Patent
Zhang et al.

(10) Patent No.: US 7,313,565 B2
(45) Date of Patent: Dec. 25, 2007

(54) DATA OVERLAY, SELF-ORGANIZED METADATA OVERLAY, AND ASSOCIATED METHODS

(75) Inventors: Zheng Zhang, Beijing (CN); Shu-Ming Shi, Beijing (CN)

(73) Assignee: Microsoft Corporation, Redmond, WA (US)

( * ) Notice: Subject to any disclaimer, the term of this patent is extended or adjusted under 35 U.S.C. 154(b) by 485 days.

(21) Appl. No.: 10/782,527

(22) Filed: Feb. 19, 2004

(65) Prior Publication Data

US 2005/0187946 A1    Aug. 25, 2005

(51) Int. Cl.
*G06F 17/30* (2006.01)
*G06F 7/00* (2006.01)

(52) U.S. Cl. .................. 707/101; 707/102; 707/10; 707/3

(58) Field of Classification Search ............. 707/10, 707/100, 3, 101, 102
See application file for complete search history.

(56) References Cited

U.S. PATENT DOCUMENTS

| | | | | |
|---|---|---|---|---|
| 7,054,867 | B2 * | 5/2006 | Bosley et al. ............... | 707/10 |
| 2004/0064693 | A1 * | 4/2004 | Pabla et al. ................ | 713/168 |
| 2005/0219929 | A1 * | 10/2005 | Navas ........................ | 365/212 |

OTHER PUBLICATIONS

Ming Xie: B2P Systems Based on Distributed Hash Table, Ming Xie, Computer Science, University of Ottawa, Sep. 26, 2003.*

Vinod Muthusamy: An Introduction to Peer-to-Peer Networks, Presentation for MIE456—Information Systems Infrastructure II, Oct. 30, 2003.*

Mathkour, Hassan, "An Intelligent Tool for Boosting Database Performance," Journal of King Saud University Computer and Information Sciences, vol. 10, 1998, pp. 81-106.

Zhao, Ben Y., et al., "Tapestry: An Infrastructure for Fault-tolerant Wide-area Location and Routing," Report No. UCB/CSD-01-1141, Computer Science Division, University of California, Berkeley, Apr. 2001, pp. 1-27.

Xu, Zhichen, et al., "Building Low-maintenance Expressways for P2P Systems," Hewlett-Packard Technical Report, HPL-2002-41, Mar. 1, 2002, pp. 1-14.

Zhang, Zheng, et al., "Self-Balanced P2P Expressway: When Marxism Meets Confucian," Microsoft Report MSR-TR-2002-72, Jul. 2002, 12 pages.

Hartman, Hans, "Tools for Dynamic Web Sites: ASP vs. PHP vs. ASP.NET," Seybold Report Analyzing Publishing Technologies, vol. 1, No. 12, Sep. 17, 2001, pp. 8-13.

(Continued)

*Primary Examiner*—Kuen S. Lu
(74) *Attorney, Agent, or Firm*—Lee & Hayes, PLLC

(57) ABSTRACT

A data overlay is described which is built as a data structure on top of a logical space defined by a distributed hash table (DHT) in a peer-to-peer (P2P) network environment. The data overlay can assume a topology of a tree having a plurality of tree nodes. Each of the tree nodes has a zone allocated to it that maps to a corresponding zone associated with a DHT node in the logical space of the DHT. Procedures are described for "growing" this tree structure, such that the tree structure is self-organizing and self-healing on the same scale as the underlying DHT. Other procedures are described for using the tree structure to gather information from the DHT nodes and to disseminate information to the DHT nodes.

25 Claims, 7 Drawing Sheets

OTHER PUBLICATIONS

Poliashenko, Max, et al., "Globalized Web Applications & ASP. NET," Dr. Dobb's Journal, vol. 27, No. 4, Apr. 2002, pp. 67-72.

El Fattah, Yousri et al., "Structured Modeling Language for Automated Modeling in Causal Networks," Qualitative Reasoning and Diagnosis, Proceedings of the Sixteenth International Joint Conference on Artificial Intelligence, vol. 16, No. 2, 1999, pp. 1108-1114.

Bertino, Elisa, "Sistemi di Gestione de Basi di Dati Orientate Agli Oggetti," Revista di Informatica, vol. 21, No. 4, Oct. 1991, pp. 395-431.

Adamic, Lada A., et al., "Search in power-law networks," Physical Review E, vol. 64, 2001, pp. 046135-1 to 046135-8.

Ratnasamy, Sylvia, et al., "A Scalable Content-Addressable Network," Proceedings of ACM SIGCOMM'01 Conference, San Diego, CA, Aug. 2001, pp. 161-172.

Castro, Miguel, et al., "Scribe: A Large-Scale and Decentralized Application-Level Multicast Infrastructure," IEEE Journal on Selected Areas in Communications, vol. 20, No. 8, Oct. 2002.

Stoica, Ion, et al., "Chord: A Scalable Peer-to-peer Lookup Service for Internet Applications," Proceedings of ACM SIGCOMM'01 Conference, San Diego, CA, Aug. 2001, pp. 149-160.

Ratnasamy, Sylvia, et al., "Topologically-Aware Overlay Construction and Server Selection," Proceedings of IEEE INFOCOMM 2002, pp. 1190-1199.

Zhuang, Shelley Q., et al., "Bayeux: An Architecture for Scalable and Fault-tolerant Wide-area Data Dissemination," Proceedings of the International Workshop on Network and Operating Systems Support for Digital Audio and Video (NOSSDAV '01), Port Jefferson, NY, 2001, pp. 11-20.

Madden, Samuel, et al., "TAG: a Tiny Aggregation Service for Ad-Hoc Sensor Networks," Proceedings of the Fifth Symposium on Operating Systems Design and Implementation (OSDI '02), 2002, pp. 131-146.

Clarke, Ian, et al., "Freenet: A Distributed Anonymous Information Storage and Retrieval System," Lecture Notes in Computer Science, 2001, vol. 2009, pp. 46-66.

Saroiu, Stefan, et al., "A Measurement Study of Peer-to-Peer File Sharing Systems," Proceedings of the Multimedia Computing and Networking, San Jose, CA, Jan. 2002, 16 pages.

LV, Qin, et al., "Can Heterogeneity Make Gnutella Scalable?" Lecture Notes in Computer Science, LNCS 2429, 2002, pp. 94-103.

Van Renesse, Robbert, et al., "Scalable Management and Data Mining Using Astrolabe," Lecture Notes in Computer Science, LNCS 2429, 2002, pp. 280-294.

Zhao, Ben Y., et al., "Brocade: Landmark Routing on Overlay Networks," IPTPS 2002, LNCS 2429, 2002, pp. 34-44.

Maymounkov, Petar, et al., "Kademlia: A Peer-to-Peer Infomration System Based on the XOR Metric," IPTPS 2002, LNCS 2429, 2002, pp. 53-65.

Rowstron, Antony, et al., "Pastry: Scalable, Decentralized Object Location, and Routing for Large-Scale Peer-to-Peer Systems," Middleware 2001, Nov. 2001, LNCS 2218, 2001, pp. 329-350.

Zhang, Zheng, et al., "SOMO: Self-Organized Metadata Overlay for Resource Management in P2P DHT," IPTPS 2003, Conference held Feb. 20-21, 2003, available at <http://iptps03.cs.berkeley.edu/final-papers/somo.pdf>, accessed on Apr. 22, 2004, 6 pages.

Gupta, Indranil, et al., "Kelips: Building an Efficient and Stable P2P DHT Through Increased Memory and Background Overhead," published in IPTPS 2003, available at <http://iptps03.cs.berkeley.edu/final-papers/kelips.pdf>, accessed on Apr. 22, 2004, 6 pages.

Dabek, Frank, et al., "Towards a Common API for Structured Peer-to-Peer Overlays," published in Proceedings of the 2$^{nd}$ International Workshop on Peer-to-Peer Systems (IPTPS '03), available at <http://www.cs.berkeley.edu/~ravenben/publications/pdf/apis.pdf>, accessed on Apr. 22, 2004, 6 pages.

Druschel, Peter, et al., "Structured peer-to-peer overlays: A new platform for distributed systems?" Presentation, available at <http://www.umiacs.umd.edu/docs/Presentation_Nov10.pdf>, accessed on Apr. 22, 2004, 62 pages.

Kaashoek, Frans, "Distributed Hash Tables: simplifying building robust Internet-scale applications," Presentation, Apr. 15, 2003, available at <http://www.media.mit.edu/events/2003-04-15-ec/kaashoek.pdf>, accessed on Apr. 22, 2004, 29 pages.

Milojicic, Dejan S., et al., "Peer-to-Peer Computing," Technical Report HPL-2002/57, HP Lab, Mar. 8, 2002, available at <http://citeseer.ist.psu.edu/milojicic02peertopeer.html> accessed on Apr. 22, 2004, pp. 1-51.

Liben-Nowell, David, et al., "Analysis of the Evolution of Peer-to-Peer Systems," published in Proceedings of the Twenty-First Annual Symposium on Principles of Distributed Computing, pp. 233-242. ACM Press, 2002. Available at <http://citeseer.ist.psu.edu/liben-nowell02analysis.html> accessed on Apr. 22, 2004, 10 pages.

* cited by examiner

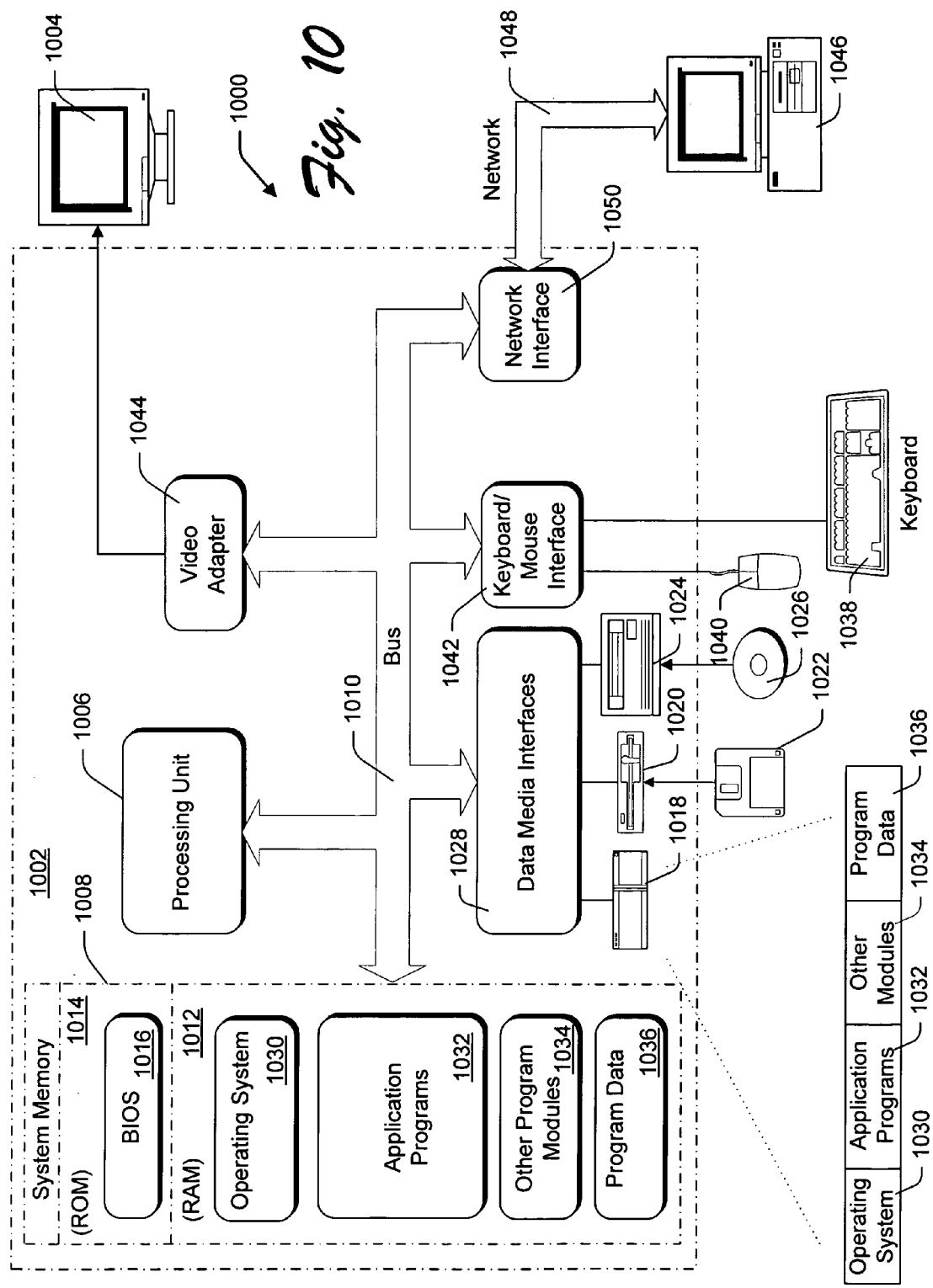

DATA OVERLAY, SELF-ORGANIZED METADATA OVERLAY, AND ASSOCIATED METHODS

TECHNICAL FIELD

This invention relates to a distributed data structure and to a technique for utilizing the data structure to interact with a peer-to-peer system.

BACKGROUND

Peer-to-peer (P2P) systems employ a network which connects participating machines having equal or similar capabilities and responsibilities. These systems perform tasks without the coordination of a conventional server (or with minimal set-up coordination by a server). For instance, FIG. 1 shows a high-level depiction of a P2P system 100. The system 100 includes a collection of peer entities (102-112) having equal or similar capabilities and responsibilities. In one example, the peer entities (102-112) may correspond to independent personal computer devices coupled together via an Internet or intranet. The peer entities (102-112) can directly transfer files or other information between themselves (as indicated by exemplary communication path 114) without the aid of a server. A general introduction to P2P systems can be found in D. S. Milojicic, V. Kalogeraki, R. Lukose, K. Nagaraja, J. Pruyne, B. Richard, S. Rollins, and Z. Xu., "Peer-To-Peer Computing," Technical Report HPL-2002-57, HP Lab, 2002.

P2P systems commonly use a distributed hash table (DHT) to facilitate the storage and retrieval of objects from peer entities participating in the systems. As the name suggests, a distributed hash table (DHT) refers to a hash table that is distributed over plural locations, such as distributed over plural stores associated with different computer devices. A distributed hash table specifies a plurality of DHT nodes having respective assigned IDs. The DHT nodes collectively define an abstract DHT logical space. An object can be inserted into or retrieved from this DHT logical space by subjecting this object to a hashing function to produce a key. This key is then used to locate a particular target node ID in the DHT logical space that will receive the object or from which the object can be retrieved. That is, each DHT node is associated with a range of keys; objects are added to or retrieved from a particular DHT node depending on whether their key falls within the range of keys associated with that particular DHT node. Unlike non-distributed hash table implementations, DHT nodes can freely join and leave the DHT logical space (e.g., corresponding to computer devices joining and leaving the P2P system, respectively), so functionality must be provided to address these events.

A variety of DHT strategies have been developed to manage the storage and retrieval of objects in a P2P system. FIG. 2 shows a Content Addressable Network (CAN) strategy, e.g., as described in S. Ratnasamy, P. Francis, M. Handley, R. Karp, and S. Shenker, "A Scalable Content-Addressable Network," ACM SigComm 2001, San Diego, Calif., USA, August 2001. This strategy models the DHT logical space as a D-dimensional Cartesian space 200. The CAN strategy partitions the space 200 as nodes join the DHT space 200. For instance, when node n1 joins, the CAN strategy allocates the entire space 200 to this node. When node n2 joins, the CAN strategy divides the space 200 into two halves and allocates each half to nodes n1 and n2, respectively. When node n3 joins, the CAN strategy divides the left half into upper and lower quarters, assigning the upper quarter to node n2 and the lower quarter to node n3. And when node n4 joins, the CAN strategy divides the lower quarter into a left eighth (which is assigned to node n3) and a right eighth (which is assigned to node n4). This procedure is repeated as many times as necessary to dynamically account for nodes being adding and removed. The resultant partitions define logical spaces used to insert and retrieve objects into and from the distributed hash table. A node can be said to "own" the objects that map to its space.

FIG. 3 shows another strategy referred to as CHORD (e.g., as described in I. Stoica, R. Morris, D. Karger, M. F. Kaashoek, and H. Balakrishnan, "Chord: a Scalable Peer-To-Peer Lookup Service for Internet Applications," ACM SigComm 2001, San Diego, Calif., USA, August 2001. In this strategy, the DHT logical space is structured as circular space 300. DHT nodes are assigned IDs and added to the circular DHT logical space 300 based of their assigned IDs. For instance, exemplary DHT nodes n1, n2, n3, n4, and n5 shown in FIG. 3 have assigned IDs that govern their "placement" on the circular DHT logical space 300. As in the case of FIG. 2, the DHT nodes partition the DHT logical space 300 as they are added, defining multiple subspaces or zones. These zones define the objects that each node "owns." For instance, to insert an object into a distributed hash table that is governed by the DHT strategy shown in FIG. 3, the object is subjected to a hashing function to produce a key. The object is then stored at the DHT node have a zone assigned to that key (e.g., at the DHT node which encompasses a range of keys that include the object's key). In both the cases of FIG. 2 and FIG. 3, a variety of lookup strategies can be used to quickly find a particular node in the P2P system. In general, the lookup strategies involve making several "hops" in the DHT logical space to narrow in on the desired target DHT node. Various mechanisms are commonly provided to expedite this search. For instance, each DHT node in the CHORD strategy stores the IDs of a set of other DHT nodes. These other IDs can increase in exponential fashion, establishing so-called "fingers" that probe out into the logical space 300. This allows the lookup procedure to quickly locate a desired DHT node with a small number of hops.

FIGS. 2 and 3 provide merely a high level overview of two exemplary known DHT routing strategies. There are many other strategies. For instance, another popular routing strategy is the PASTRY routing strategy, as described in A. Rowstron and P. Druschel, "Pastry: Scalable, Distributed Object Location and Routing for Large-Scale Peer-To-Peer Systems," 18th FIFP/ACM International Conference on Distributed Systems Platforms (Middleware), Heidelberg, Germany, November 2001.

P2P systems offer many benefits over conventional client-server strategies. For instance, P2P systems have the ability to automatically and freely expand and contract without central coordination. But this lack of supervisory coordination also poses various challenges. For instance, it may be desirable to have the P2P system act in concert to perform some global function. For instance, in various instances, it may be desirable to collect data from the participants of the P2P system. Or it may be desirable to disseminate information to the participants in the P2P system. With a client-server approach, a server can simply poll its clients to collect information from its clients, or broadcast information to its clients to disseminate information to its clients. But data gathering and dissemination becomes more problematic in a P2P system because it is formed by a loose alliance of interconnected peers that can freely come and go. Adding centralized conventional reporting functionality may have the effect of complicating the P2P system, and thus reducing its flexibility and utility.

There is accordingly an exemplary need in the art for an efficient strategy for interacting with a P2P DHT that will allow, for instance, for the gathering of data from its participants and the dissemination of information to its participants.

SUMMARY

According to one exemplary implementation, a method is described for building a data overlay. The method includes providing a distributed hash table (DHT) that governs the insertion and retrieval of objects into and from a peer-to-peer system, wherein the distributed hash table includes a logical space including a plurality of DHT nodes having an associated plurality of DHT zones. The method also includes building the data overlay as a data structure on top of the logical space of the distributed hash table by associating objects in the data structure with the DHT nodes, and by establishing links between the objects in the data structure.

According to another exemplary implementation, the above-described data overlay can have a topology of a tree, the tree having a plurality of tree nodes associated with respective DHT nodes, wherein each tree node has a respective tree node zone associated therewith which corresponds to a part of the logical space of the distributed hash table.

According to another exemplary implementation, a method is described for passing data through a data overlay. As in the previous case, the method includes providing a distributed hash table (DHT) that governs the insertion and retrieval of objects into and from a peer-to-peer system, wherein the distributed hash table includes a logical space including a plurality of DHT nodes having a plurality of associated DHT zones. The method further includes building a data overlay as a data structure on top of the logical space of the distributed hash table by associating objects in the data structure with the DHT nodes, and by establishing links between the objects in the data structure, wherein the data overlay defines a plurality of interconnected nodes. In this implementation, the method further includes routing data through the data overlay by passing the data through its interconnected nodes.

According to another exemplary implementation, the above-described data overlay used for routing has a topology of a tree, the tree having a plurality of tree nodes associated with respective DHT nodes. The routing of data through the data overlay can include gathering data from DHT nodes and passing the data up through the tree nodes to a root node of the tree. The routing of data through the data overlay can also include disseminating data from the root node of the tree, through the tree nodes, to the DHT nodes.

Additional implementations and features will be described in the following.

BRIEF DESCRIPTION OF THE DRAWINGS

FIG. 10 shows an exemplary computer used to implement a participant of a P2P system, where the P2P system includes a data overlay built on top of its DHT.

Figure 1:
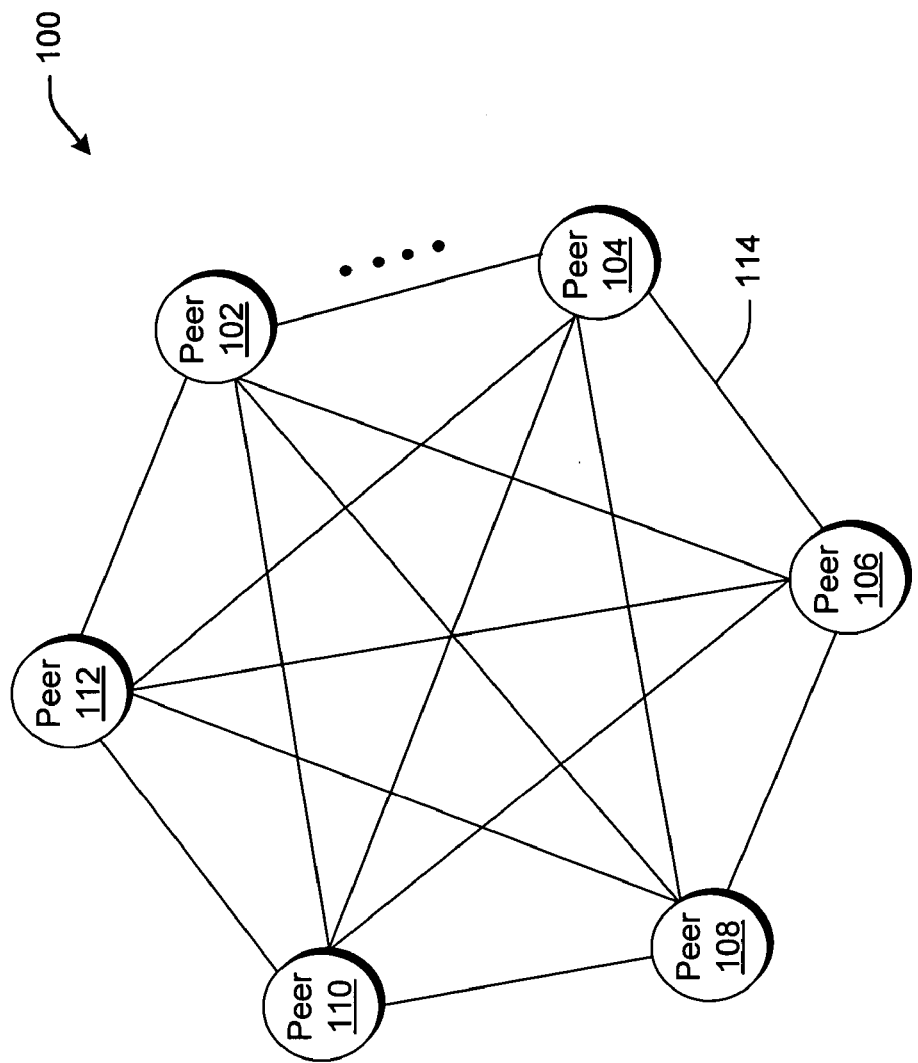
FIG. 1 shows a conventional peer-to-peer (P2P) system.
Figure 2:
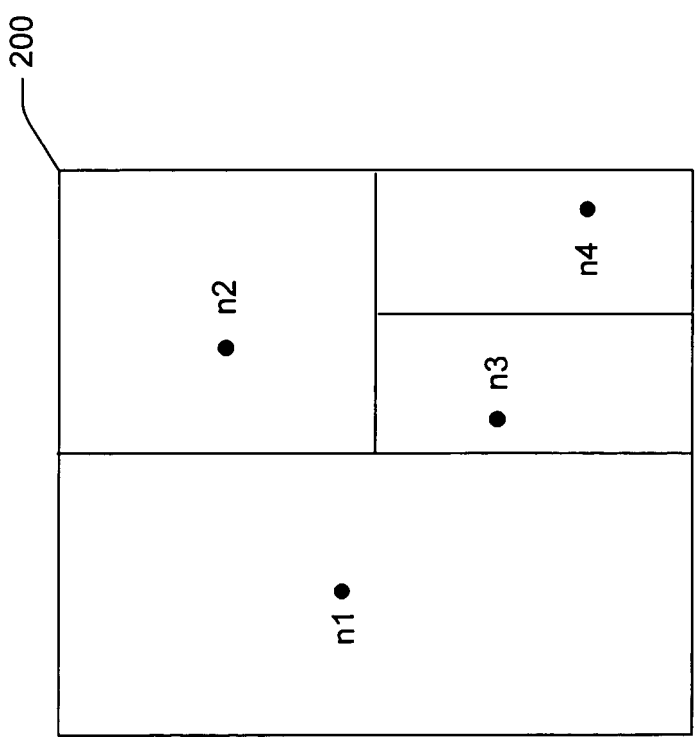
FIG. 2 shows a conventional CAN routing strategy.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The strategies described herein pertain to a data structure built "on top" of a distributed hash table (DHT) used in a peer-to-peer (P2P) system. The term peer-to-peer (P2P) system can describe any interconnection of participants in which the participants can directly interact with others, such as the interconnection network 100 shown in FIG. 1. In one implementation, the P2P system does not require the assistance of any server-type entities. The participants can include any kind of entity, including personal computers, laptop computers, personal digital assistants, application-specific computing devices, and so on. The participants can communicate with each other via any combination of routing infrastructure, such as hardwired and/or wireless communication routing mechanisms, various routers, gateways, etc. Further, the participants can communicate with each other through any combination of network protocols, such as TCP/IP (e.g., as provided by the Internet or an intranet).

More generally, any of the functions described herein can be implemented using software, firmware (e.g., fixed logic circuitry), manual processing, or a combination of these implementations. The term "logic" or "module" as used herein generally represents software, firmware, or a combination of software and firmware. For instance, in the case of a software implementation, the term "logic" or "module" represents program code that performs specified tasks when executed on a processing device or devices (e.g., CPU or CPUs). The program code can be stored in one or more computer readable memory devices.

This disclosure includes the following: Section A describes a general data overlay structure that can be built "on top" of a P2P DHT; Section B describes an exemplary tree structure built using the concept of a data overlay set forth in Section A; Section C describes an exemplary method for building the tree structure and for subsequently applying it to the gathering and dissemination of information in a P2P system; and Section D describes an exemplary P2P participant that can be used in the type of P2P DHT system described in Sections A-C.

A. The Data Overlay

Figure 3:
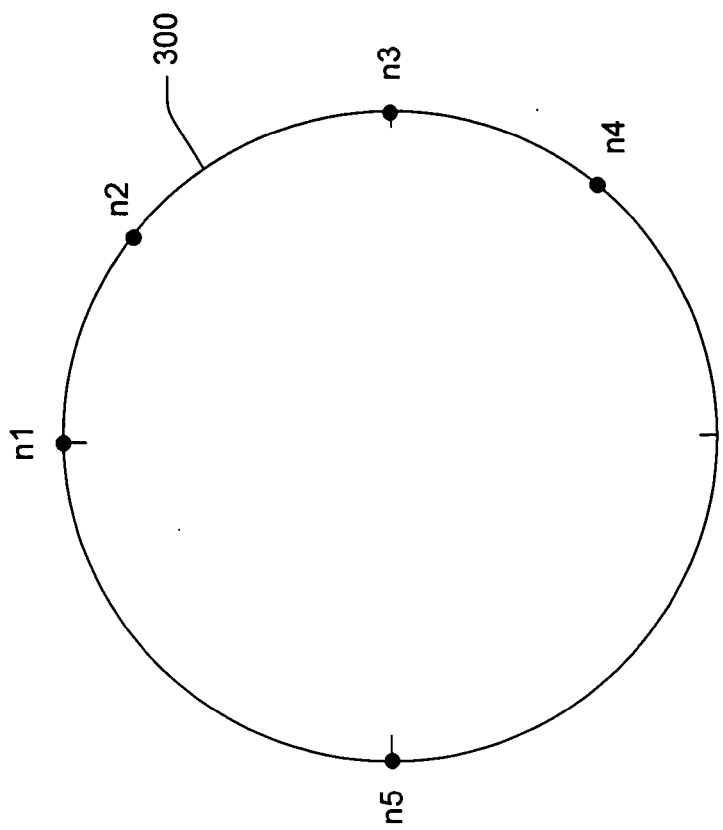
FIG. 3 shows a conventional CHORD routing strategy.

The novel concept of a "data overlay" is described here. A data overlay is a data structure comprised of objects. The data structure is implemented "on top" of a distributed hash table. By way of background, a distributed hash table (DHT) provides a technique for inserting objects into and retrieving objects from a distributed store provided by a P2P system. It performs this task by defining a collection of DHT nodes within a logical DHT space. That is, the DHT technique assigns each DHT node to a predetermined portion of the DHT logical space, referred to as the "zone" of the DHT node. For example, in the CHORD technique, a particular DHT node's zone can be interpreted as the span defined between that particular DHT node and its adjacent node in a circular DHT logical space (e.g., as shown in FIG. 3). An object is stored by hashing it to produce a key, and then using this key to associate the object with a particular node ID in the DHT logical space. The object is retrieved from the DHT logical space in a related manner. The associated zones ultimately map into real machines (e.g., computer devices and associated file storage systems), although there need not be a one to one relationship between nodes and machines.

Figure 4:
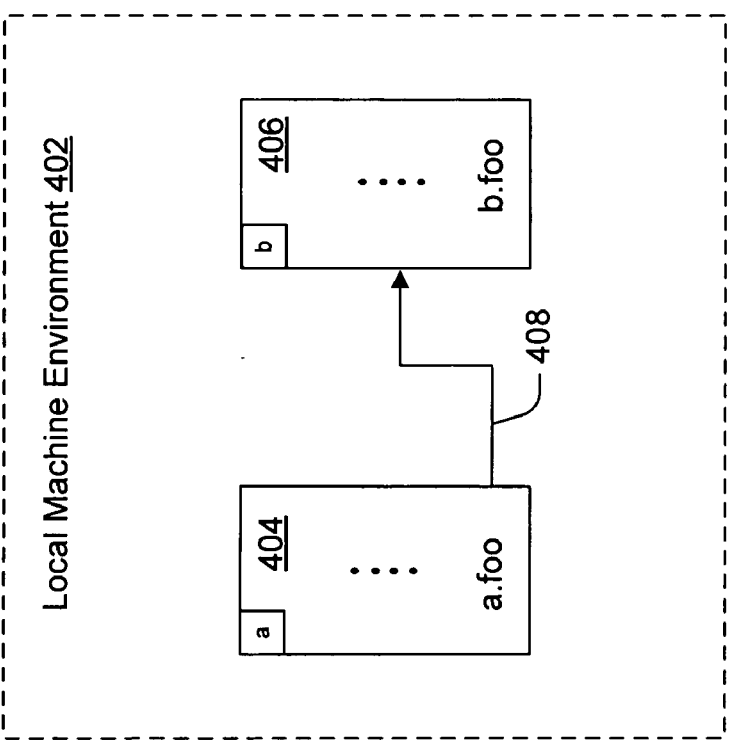
FIG. 4 shows a conventional technique for linking two objects of a data structure in the context of a local machine environment.

The data overlay is implemented "on top" of the DHT in the sense that its objects are associated with nodes in the DHT logical space. Further, an application traverses (or routes) from one object to another in the data overlay's data structure using the underlying protocols and services of the P2P DHT. More specifically, for frame of reference, consider the conventional case of FIG. 4 of a single machine environment 402. In this environment 402, a data structure includes two objects, a 404 and b 406, implemented in the storage provided by a single machine. An object broadly represents any unit of any type of information; in a conventional case, for instance, an object can correspond to a database record, e.g., a document. In the example of FIG. 4, object a 404 contains a pointer 408 that references object b 406.

Figure 5:
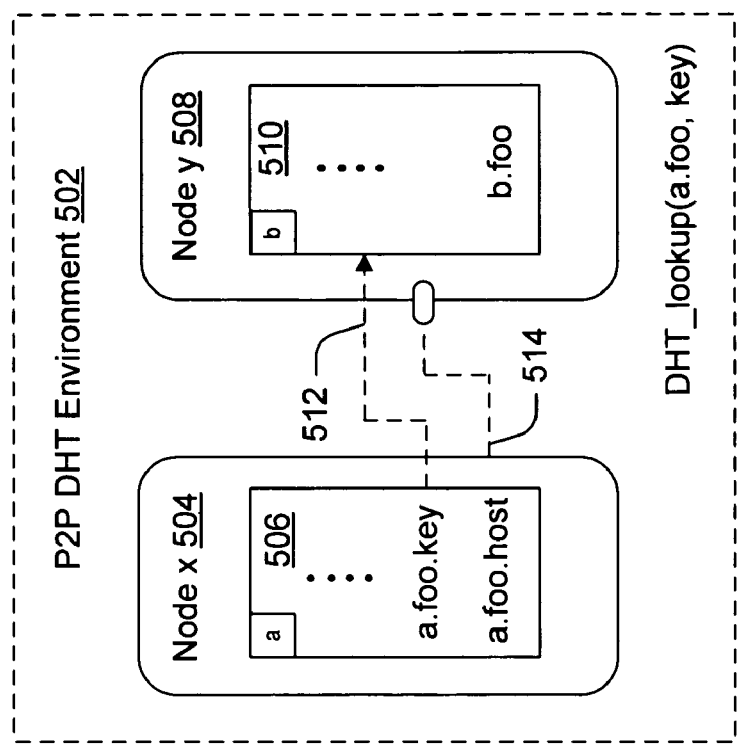
FIG. 5 shows an exemplary technique for linking two objects of a data structure in a P2P distributed hash table (DHT) environment, where the two objects are associated with two different nodes in the P2P DHT environment. The linking technique forms the basis of a data overlay placed "on top" of the DHT.

In contrast, FIG. 5 shows the implementation of a data overlay in the context of a P2P DHT environment 502. In this environment 502, since the objects are built "on top" of the DHT node framework already provided by the DHT, individual nodes in the DHT logical space "host" the objects in the data overlay. For example, DHT node x 504 hosts object a 506, and DHT node y 508 hosts object b 510. In this example, object a 506 references object b 510. Generally, object a 506 can link to object b 510 by storing the key that is used to access object b 510. This key is established when object b 510 is created. In the case of FIG. 5, however, the referencing scheme includes two fields. A first field 512 contains a hardwired address that points from object a 506 to object b 510. This field is referred to as a.foo.key. A second field 514 contains a soft-state reference that identifies the last known DHT node (e.g., node y 508) that hosts object b 510. This field is referred to as a.foo.host. The second field 514 thus serves as a routing shortcut to access object b 510.

Because the nodes of the data overlay can be dispersed over plural DHT nodes, the data overlay itself can be regarded as a distributed data structure. Although the data structure is distributed, it may be desirable to store it in such a manner that its objects are not unduly widely geographically dispersed. This can be achieved by generating the keys of a 506 and b 510 so that they are close to each other. This makes it more likely that the P2P DHT system will associate these keys with the same node in the P2P system or in closely related nodes in the P2P DHT system.

The data overlay also provides a collection of primitives used to manipulate pointers and objects in its data structure. More specifically, these primitives include a procedure (setref) for establishing a reference from object a to another object b, a procedure (deref) for returning an object pointed to by object a, and a procedure for deleting (delete) an object pointed to by object a.

Because the data overlay is implemented on top of the DHT system, its primitives use the DHT's services. For example, the primitives can use a DHT_insert service for inserting an object into the DHT logical space. The primitives can use a DHT_lookup service for using a predetermined DHT routing procedure to find an object based on its key in the DHT logical space (such as the exponential finger lookup structure used by CHORD). And the primitives can also use a DHT_direct procedure for directly accessing an object if the DHT node that stores the object is known in advance. In other words, DHT_direct bypasses the normal DHT_lookup routing procedure and directly seeks the node that hosts the object given its key. Both DHT_lookup and DHT_insert will, as a side effect, return the DHT node in the DHT that currently hosts the target object.

More specifically, an exemplary procedure for establishing a pointer from one object to another is provided in the following exemplary pseudo-code:

Pseudo-Code Excerpt No. 1: Exemplary setref Primitive

```
setref(a.foo, b) {    // initially a.foo==null; b is the object
                      // to which a.foo will point to
    a.foo.key=b.key
    a.foo.host=DHT_insert(b.key, b)
}
```

In this procedure, the first field in the referencing scheme, a.foo.key, is assigned the key value of the object which it points to (that is, b.key). The second field in the referencing scheme, a.foo.host, is assigned the value returned by the DHT_insert service.

As exemplary procedure for returning an object pointed to by a.foo is provided in the following exemplary pseudo-code:

Pseudo-Code Excerpt No. 2: Exemplary deref Primitive

```
deref(a.foo) {         // return the object pointed to by a.foo
    if (a.foo≠null) {
        obj=DHT_direct(a.foo.host, a.foo.key)
        if obj==null {   // object has moved
            obj=DHT_lookup(a.foo.key)
            a.foo.host = node returned
        }
        return obj
        else return "non-existent"
    }
}
```

This procedure attempts to directly retrieve the object b using DHT_direct based on the a.foo.host field and the a.foo.key field. However, if this is not successful, the procedure attempts to retrieve the object b using the DHT_lookup service based on the a.foo.key. The DHT_lookup service also will return the node that hosts the object b, which is assigned to the field a.foo.host.

Finally, an exemplary procedure for deleting an object pointed to by a.foo is provided in the following exemplary pseudo-code:

Pseudo-Code Excerpt No. 3: Exemplary Delete Primitive

```
delete(a.foo) {         // delete the object pointed to by a.foo
    DHT_delete(a.foo.key)
    a.foo=null
}
```

This procedure uses the DHT_delete service of the underlying DHT to delete the object b based on the field a.foo.key.

The data overlay can be implemented using its underlying DHT service by modifying whatever library routines are used to create objects so that these routines also establish the pointers described above as attributes of the objects. The library routines should also be modified to accommodate the primitives described above for setting a reference, returning an object pointed to by a reference, and deleting an object pointed to by a reference.

There are a number of advantages to building the data overlay on top of a DHT. For example, the DHT is designed to self-organize as DHT nodes are added to and deleted from the DHT logical space (related to real machines joining and leaving the P2P system, respectively). The DHT is also designed to automatically "heal" itself in response to DHT nodes being added to and deleted from the DHT logical space (such as by reestablishing links between nodes, transferring objects between nodes, etc.). By virtue of being implemented on top of the DHT, the data overlay can also adopt the features of self-organizing and self-healing. More specifically, the data overlay can be configured such that it is self-organizing and self-healing on the same scale as the underlying DHT.

Further, various applications can be ported to run on top of a P2P DHT, giving these applications the illusion of an infinite storage space (e.g., giving the impression of a single resource pool having a large size encompassing the nodes of the DHT logical space). This storage space can broadly include memory heaps of machines that are participating in the P2P DHT system. The host routing shortcut (e.g., a.foo-.host) makes the performance of applications utilizing the data overlay independent of the underlying DHT system.

B. The SOMO Tree Structure; an Instance of the Data Overlay

The above data overlay provides a framework for building an arbitrary data structure on top of a DHT. The data structure includes a plurality of objects which constitute nodes in the data structure. This data structure can assume any kind of topology by linking the nodes together in different ways. Further, the data structure can implement different functions depending on the operations assigned to its individual nodes. The following section described an exemplary instance of the data overlay data overlay referred to as a Self-Organized Metadata Overlay, or "SOMO" for brevity.

The SOMO data structure is constructed to assume the topology of a tree structure. The SOMO tree structure has a root node. The root node can have one or more children, which, in turn, can have their own respective children. The terminal nodes of the SOMO tree structure are referred to as leaf nodes. The leaf nodes are associated with respective DHT nodes in the DHT logical space of the P2P DHT system.

As will be described in greater detail in Section C below, one function of the SOMO tree structure is to extract metadata from the DHT nodes (which ultimately involves extracting data from the machines that implement the P2P system) and to pass this metadata up through the SOMO tree to the root node of the SOMO tree structure. An application can then read this metadata and perform some action on the basis of this metadata. (Metadata generally refers to any kind of information associated with the operations being performed in the P2P system, such as information regarding the performance of machines that comprise the P2P system). The SOMO tree structure can also be used to disseminate information from the root node of the SOMO tree structure down to the DHT nodes and associated machines within the P2P system. Thus, generally speaking, the SOMO tree structure can serve the role of data gathering (e.g., aggregation) and data broadcast.

Figure 6:
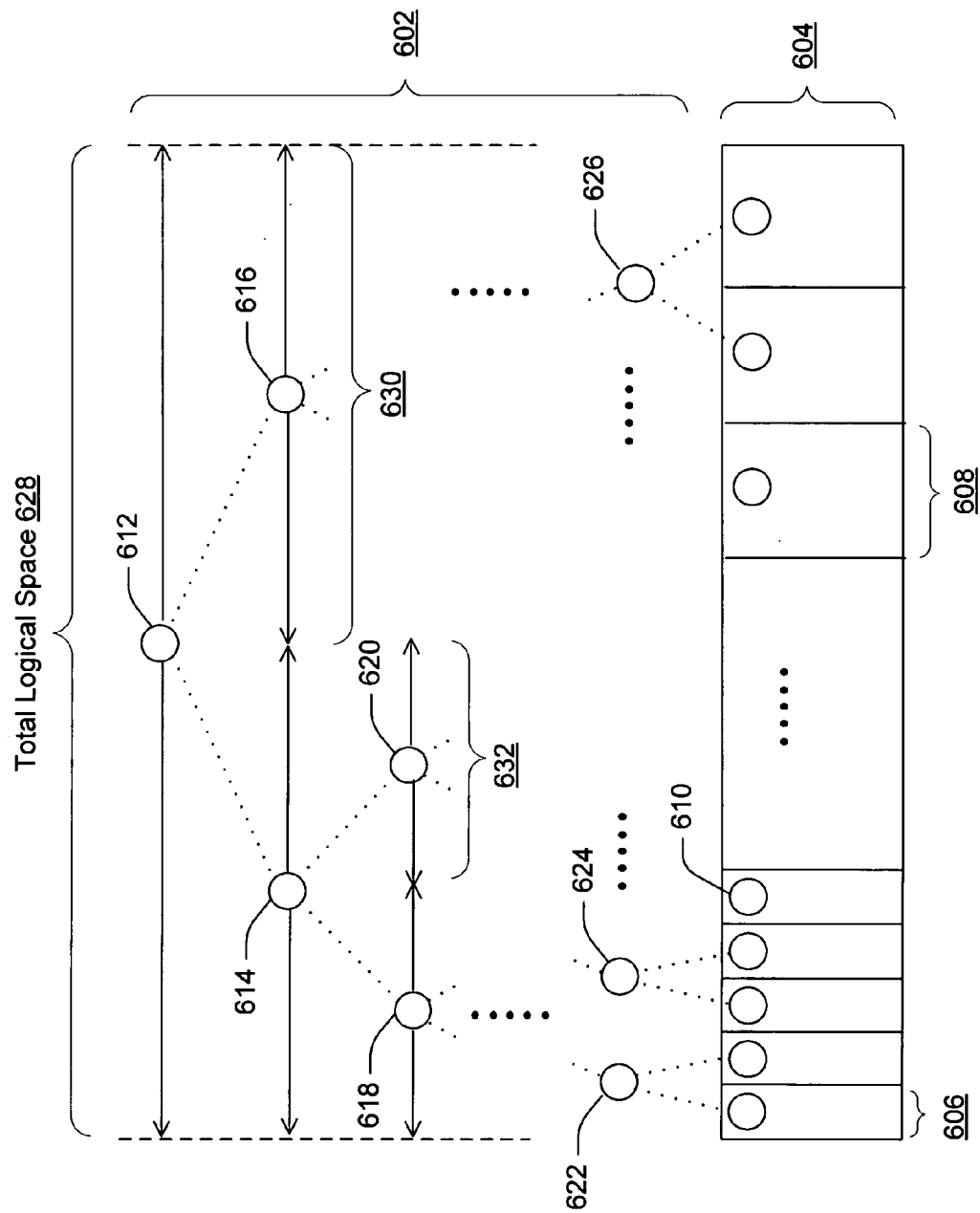
FIG. 6 shows an exemplary tree structure constructed using the concept of a data overlay depicted in FIG. 5. The tree structure is referred to a Self-Organized Metadata Overlay (SOMO).

FIG. 6 illustrates an exemplary SOMO tree structure 602 that is built on top of an underlying DHT logical space 604. The DHT logical space 604 is partitioned into a number of zones, such as exemplary zone 606 and exemplary zone 608. Each zone includes a DHT node associated therewith, such as exemplary DHT node 610. The DHT can partition the DHT logical space 604 into zones according to any technique, such as exemplary techniques provides by the CAN partitioning scheme, CHORD partitioning scheme, PASTRY partitioning scheme, or any other kind of DHT partitioning scheme. For example, using the CHORD partitioning scheme, the DHT logical space 604 can be defined as a ring having nodes dispersed at various locations around it, and the zones can correspond to the spans that separate neighboring adjacent DHT nodes on the ring.

The SOMO tree structure 602 includes one or more nodes that are referred to here as "SOMO nodes" to distinguish them from DHT nodes. Each SOMO node is represented by symbol s. The exemplary SOMO tree structure 602 shown in FIG. 6 includes SOMO nodes s 612-626. The nodes s 612-626 form an inverted tree shape. Namely, a root node 612 branches off into child node 614 and child node 616. These child nodes can have their own respective child nodes; for example, child node 614 includes child node 618 and child node 620. Although the full structure of the exemplary SOMO tree structure 602 is abbreviated in FIG. 6 to facilitate illustration and discussion, the SOMO tree structure 602 ultimately terminates in leaf nodes (e.g., leaf nodes 622, 624, 626) planted in corresponding DHT nodes in the DHT logical space 604. In general, the links between the SOMO nodes in the SOMO tree structure 602 are illustrated in FIG. 6 by dotted lines that connect the SOMO nodes together; these links can be implemented using the referencing scheme described in Section A above.

Each SOMO node s has a zone associated therewith. For example, the root SOMO node 612 includes a zone 628 that spans the entire DHT logical space 604. Child node 616 includes a zone 630 which spans one half of the root node 612's zone 628. Another child node 620 that is deeper in the SOMO tree structure 602 has a zone 632 that is one quarter of the root node 612's zone 628. Accordingly, successive nodes s added to the hierarchy of the SOMO tree structure 602 result in progressively finer partitioning of the root node 612's zone 628. Also, the hierarchy of the SOMO tree structure 602 grows "taller" for those regions of the DHT logical space 604 that exhibit finer (that is, denser) partitioning of the space 604. In general, FIG. 6 represents the zones associated with individual SOMO nodes by horizontal arrows that span the length the SOMO nodes' respective zones. A DHT node that hosts a particular SOMO node s is expressed as DHT_host(s).

An exemplary data structure that can be used to implement each SOMO node s is given by the following code excerpt:

Pseudo-Code Excerpt No. 4: Exemplary SOMO Node Data Structure

```
struct SOMO_node {
    string key
    struct SOMO_node *child[1..k]
    DHT_zone_type Z
    SOMO_op op
    Report_type report
}
```

The member report in the above data structure indicates the type of report that a particular SOMO node is entrusted to handle, such as a sorted list. The member Z in the above data structure identifies the zone which this particular SOMO node's report member covers. That is, for example, the zone Z for SOMO node 620 corresponds to zone 632 shown in FIG. 6. The key member in the above data structure refers to a key assigned to this particular SOMO node. This key can be generated by applying a deterministic function to the SOMO node's zone Z. For instance, the key can correspond to the center of the zone Z, or the result of a hashing function applied to the zone Z, such as a hash of Z's defining coordinates. For example, assume that a zone is defined by the 1D logical span of 0 to 1, e.g., [0, 1]; in this case, the key can correspond to the center coordinates of this zone [i.e., 0.5], or some hash of these coordinates. By virtue of this key referencing scheme, a SOMO node s will be hosted by a DHT node that covers s.key (e.g., the center of s.Z). This allows a SOMO node to be retrieved deterministically as long as an application knows its region. This provision is particularly useful when querying system status in a given key-space range.

The above data structure also identifies the children of the particular SOMO node, e.g., by storing pointers to these children. As describe above, the addition of children has the effect of diving the SOMO node's zone Z by a factor of k. Each child is allocated to one of these zone partitions. That is, a SOMO node's i-th child will cover the i-th fraction of region s.Z. This recursion continues until a termination condition is met (to be discussed below). Since a DHT node will "own" a piece of the DHT logical space 604, a leaf SOMO node s is therefore guaranteed to be "planted" in it.

Finally, the member op defines an operation that the particular SOMO node can perform on information that passes through it (in either a data gathering or data dissemination mode.). For example, the op can specify that a merge-sort operation is to be performed in the course of collecting information using the SOMO tree structure 602. By virtue of the inclusion of the op member, the SOMO tree structure 602 can execute any functionality in a distributed and parallel manner. Thus, the SOMO tree structure 602 can also be viewed as a mechanism for providing a distributed parallel processing framework to implement any kind of functionality.

C. Method for Building and Applying the SOMO Tree Structure

C.1. Building the SOMO Tree Structure

As mentioned above, the data overlay can grow and shrink as a function of dynamic and unsupervised modifications made in the underlying DHT. Since the SOMO tree structure 602 is an instance of the data overlay, this means that the SOMO tree structure 602 also has the ability to grow and shrink in response to modifications made to the underlying DHT. Also, the SOMO tree structure, like its underlying DHT, has the ability to heal itself to counteract modifications in the underlying DHT. This subsection describes the manner in which the SOMO tree structure 602 evolves in response to changes in its underlying DHT.

In one implementation, the SOMO tree structure 602 is grown by first adding the root node 628 corresponding to an initial DHT node added to the DHT logical space 604, and then successively adding additional SOMO nodes s as additional DHT nodes are added to the DHT logical space 604. In this manner, the SOMO tree structure 602 grows "taller" as the DHT logical space 604 becomes more finely partitioned.

Figure 7:
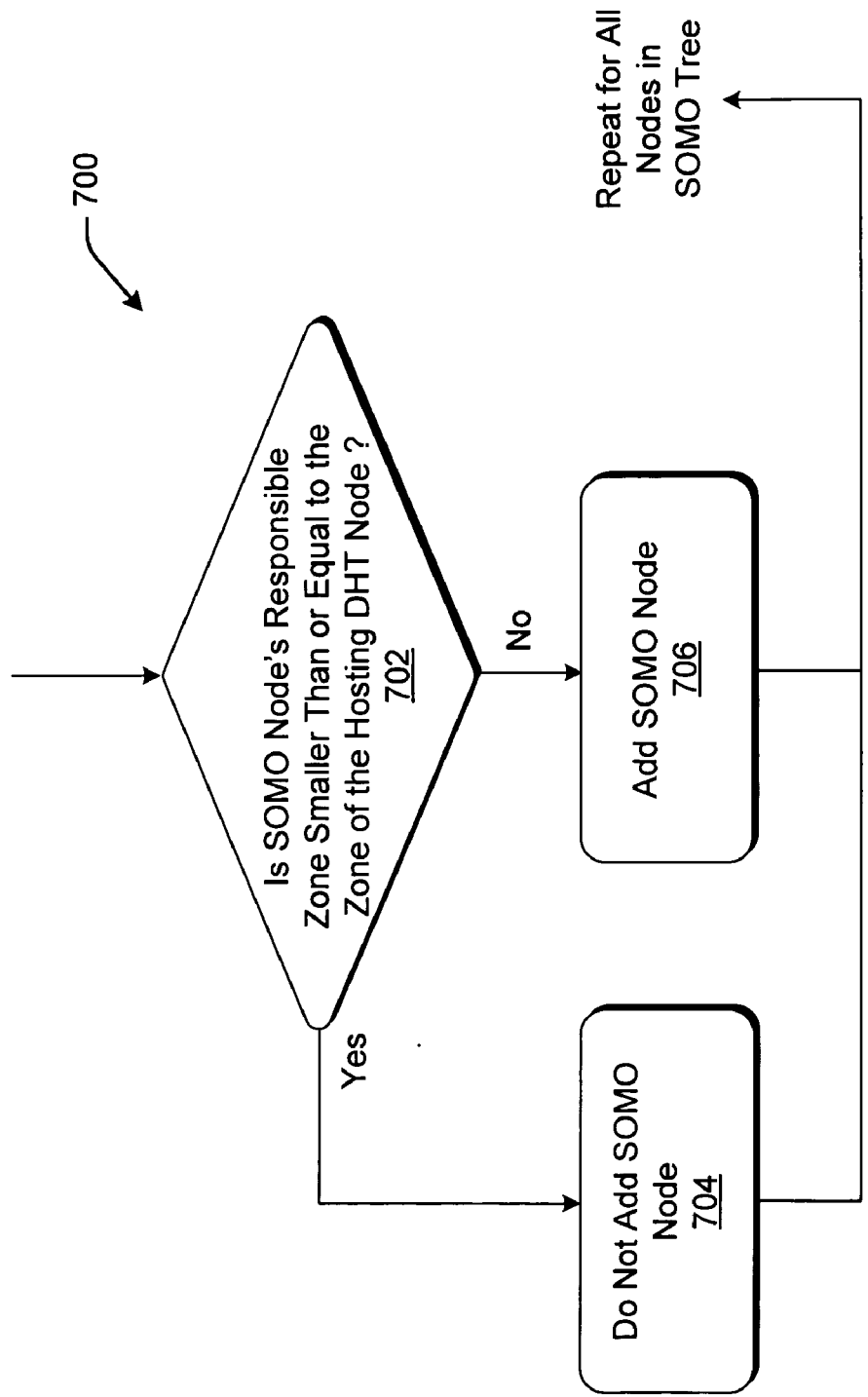
FIG. 7 shows an exemplary procedure for building the SOMO tree structure of FIG. 6.

FIG. 7 shows a high level depiction of a procedure 700 used to determine whether child nodes should be added to a particular SOMO node s. In step 702, it is determined whether the SOMO node's responsible zone s.Z is smaller than or equal to that of its hosting DHT node's zone. If step 702 is answered in the affirmative, then this SOMO node already corresponds to a leaf planted in the correct DHT node, and there is no need to add a child to this particular SOMO node. This outcome is represented by step 704 of FIG. 7. Alternatively, if step 702 is answered in the negative, this means that the SOMO node's zone s.Z encompasses partitions in the DHT logical space 604 that are not currently accounted for by the SOMO tree structure 602. Since the SOMO tree structure 602 needs to interact with these DHT partitions, the procedure 700 responds by adding another SOMO node s to the SOMO tree structure 602. The SOMO node s has the data structure defined above.

The procedure shown in FIG. 7 refers to decisions and actions made with respect to an individual SOMO node s in the SOMO tree structure 602. These operations are repeated for each individual SOMO node in the SOMO tree structure 602. Furthermore, these operations can be repeated at periodic intervals. By virtue of this procedure, the SOMO tree structure 602 automatically adapts to changes in the DHT logic space 604 by adding SOMO child nodes. As described above, the SOMO tree structure 602 will be "taller" in logical space regions where DHT nodes are denser (that is, more finely partitioned). Nodes can also be removed from the SOMO tree structure 602 to react to the removal of DHT nodes from the DHT logical space 604.

The following pseudo-code provides one exemplary routine (e.g., SOMO_grow) to add SOMO nodes to the SOMO tree structure 602:

Pseudo-Code Excerpt No. 5: Exemplary SOMO Grow Procedure

```
SOMO_grow(SOMO_node s) {
    // check if it is necessary to add any children
    if (s.Z ⊆ DHT_host(s).Z) return
    for i=1 to k
        if (s.child[i]==NULL && the i-th sub-space of s.Z ⊄
```

```
        host(s) .Z) {
            t = new(type SOMO_node)
            t.Z = the i-th sub-space of s.Z
            t.key = SOMO_loc(t.Z)
            setref(s.child[i], t) // inject into DHT
        }
    }
```

This procedure involves initializing a SOMO node object and its appropriate fields, and then calling the setref primitive (defined above) to install the pointer (that links this SOMO node to the data structure); this last step involves invoking a DHT operation. As described above, the SOMO_grow procedure also involves deterministically calculating a SOMO node's key given the region it covers.

The SOMO_loc procedure used in the above-defined routine can be implemented using the following pseudo-code:

Pseudo-Code Excerpt No. 6: Exemplary SOMO_loc Procedure

```
        SOMO_loc(DHT_zone_type Z) {
            return center of Z
            // optionally
            // return hash_of (Z)
        }
```

As described above, the above-described SOMO_grow procedure is performed in a top down fashion, and is executed periodically. In another implementation, a bottom-up protocol can be employed. When nodes are removed from the DHT logical space 604, the SOMO tree structure 602 will prune itself accordingly by deleting redundant child SOMO nodes.

For an N-node system where nodes populate the total logical space evenly, there will be 2N SOMO nodes when the SOMO fan-out k is 2. The crash of a DHT node will take away the SOMO nodes that this DHT node is hosting. However, the crashing DHT node's zone will be taken over by another DHT node after repair. Consequently, the periodic checking of all child SOMO nodes ensures that the SOMO tree structure 602 can be completely reconstructed in $O(\log_k N)$ time (where the conventional "Big O" notation is used here to express algorithm performance). Because the SOMO root node is always hosted by the DHT node that owns one deterministic point of the total DHT logical space 604, that DHT node ensures the existence of the SOMO root node and invokes the SOMO_grow routine on the SOMO root node.

In one case, the result of the SOMO_grow procedure is the exemplary SOMO tree structure 602 shown in FIG. 6. SOMO nodes are scattered among DHT nodes. The SOMO tree structure 602 can be physically implemented in distributed fashion in the stores of individual machines or other infrastructure that comprise the P2P system.

C.2. Applying the SOMO Tree Structure

As described above, one exemplary use of the SOMO tree structure 602 is to gather information from the physical machines in the P2P system that are represented by the DHT logical space 604. Another exemplary use of the SOMO tree structure 602 is to disseminate information to those physical machines. The information collected can be metadata. Metadata describes information regarding the operation of the P2P system, such as information that reflects the behavior of its physical machines. The information that is disseminated to the physical machines can represent instructions that can govern the operation of the physical machines. One can thus interpret the SOMO mechanism as performing a converge cast from the SOMO leaf nodes to the SOMO root node to provide data gathering, and then performing a multicast back down to the SOMO leaf nodes to provide data dissemination.

Figure 8:
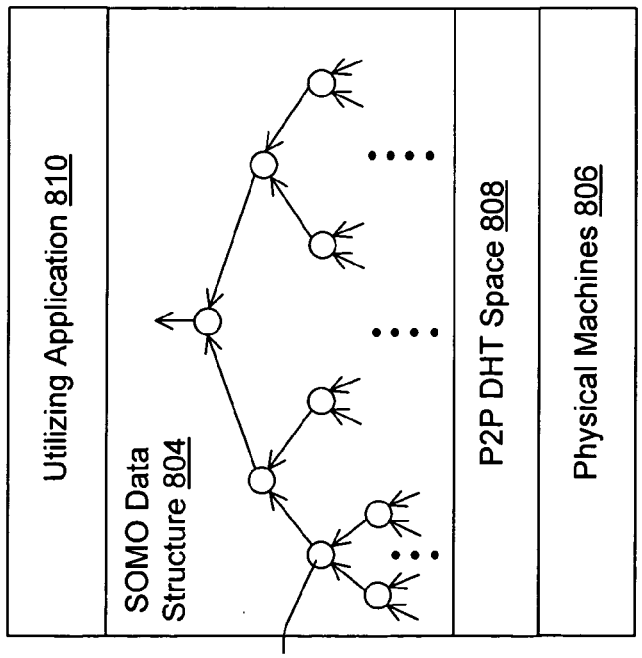
FIG. 8 shows an exemplary application of the SOMO tree structure of FIG. 6 to the collection information from the participants of the P2P system.

For example, FIG. 8 represents a scenario 802 in which a SOMO tree structure 804 is being used to collect information from physical machines 806 in the P2P system via the DHT logical space 808. More specifically, the leaf SOMO nodes retrieve the required information from their hosting DHT nodes. (As a side-effect, this procedure can also restart a child SOMO node if it has disappeared because its hosting DHT node crash has crashed). One or more applications 810 can invoke this gathering operation for any defined purpose (such as for the purpose of performance monitoring, that is, collecting information regarding various loads and capacities of the physical infrastructure that comprises the P2P system).

More specifically, FIG. 8 depicts the configuration of the SOMO tree structure 804 to gather information by showing arrows that point from each SOMO node to its corresponding parent SOMO node. In this manner, information funnels up the SOMO tree structure 804 from its leaf SOMO nodes to its root SOMO node. The application(s) 810 can extract a complete report from the root SOMO node that culls information from the entire P2P system. This report can contain raw unorganized data. Alternatively, this report can contain merged and sorted data provided that the SOMO nodes have been configured to perform this function before passing the information that they collect onto to their corresponding parent SOMO nodes. The SOMO nodes can be configured to perform this task by configuring the op member to perform merging and sorting. This is merely one illustrative example. The SOMO nodes can execute other operations on the information as it passes through the SOMO nodes on its way to the root SOMO node, such as various arithmetic operations.

The following pseudo-code provides one technique for gathering information using the SOMO tree structure 804.

Pseudo-Code Excerpt No. 7: SOMO Gathering Procedure

```
        get_report (SOMO_node s) {
            Report_type rep [1 . . . k]
            for i∈[1 . . . k]
                if (s.child[i] ≠ NULL) // retrieving via DHT
                    rep[i] = deref(s.child[i]).report
            s.report = s.op(rep[ ])
        }
```

To gather system metadata, the SOMO nodes can periodically perform the above procedure by requesting reports from their respective children.

The gather procedure can be tuned to extract specific information from the SOMO tree structure 804. More specifically, the hierarchical nature of the SOMO tree structure 804 facilitates the use of complex range queries to discover information relevant to a given logical DHT space region. For example, if k is 2, and it is desired to retrieve a status report of the first quarter of the DHT logical space, an application need only obtain a report from the left child SOMO node of the second-level SOMO tree structure 810 (e.g., SOMO child node 812). Another useful implementation involves registering queries at SOMO nodes, which essentially transforms the SOMO mechanism into a publish-subscribe ("pub-sub") infrastructure.

Figure 9:
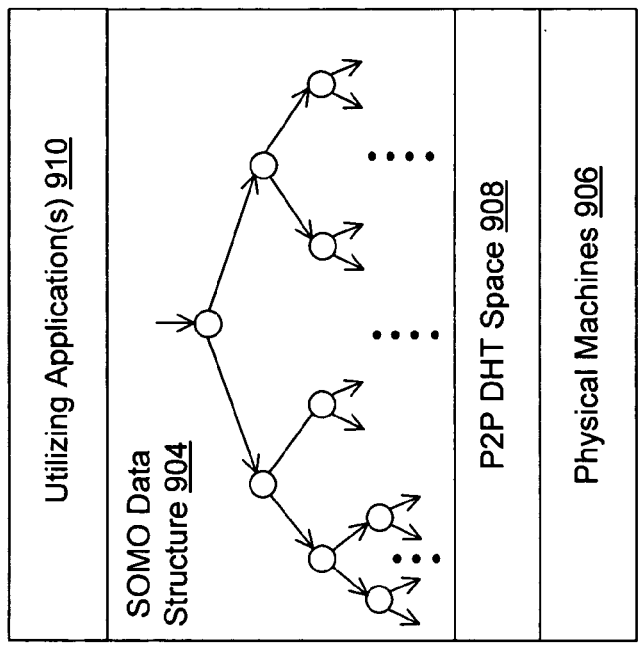
FIG. 9 shows an exemplary application of the SOMO tree structure of FIG. 6 to the dissemination of information to the participants of the P2P system.

In contrast, FIG. 9 shows a scenario 902 in which a SOMO tree structure 904 is being used to disseminate information to physical machines 906 in the P2P system via the DHT logical space 908. One or more applications 910 can invoke this dissemination operation for any defined purpose (such as for disseminating instructions to the physical machines 906). The configuration of the SOMO tree structure 904 to disseminate information is represented in FIG. 9 by showing arrows that point from parent SOMO nodes to their respective child SOMO nodes. In this manner, information propagates down the SOMO tree structure 904 from its root SOMO node to its leaf SOMO nodes. The information can be propagated through the SOMO tree structure 904 without modification by the SOMO nodes. Alternatively, by virtue of their op member, the SOMO nodes can perform any kind of operation on the information before it is passed to their associated child SOMO nodes. Also, as described for the case of data gathering, it is possible to disseminate information to only parts of the DHT logical space 908 by involving only selected parts of the SOMO tree structure 904.

In general, the procedures shown in FIGS. 8 and 9 describe scalable and fault tolerant mechanisms that can be used in a number of information gathering and disseminating applications. For example, the SOMO mechanism can be used to monitor the health of a P2P system and to provide a UI interface to clients (which alerts these clients to this heath information). This can be implemented by gathering information from various performance counters installed on machines used in the P2P system.

Additional applications and variations of the data overlay and SOMO tree structure can be implemented. For example, in one exemplary implementation, the SOMO mechanism can be configured to locate multiple classes of critical nodes in the routing structure of the SOMO tree structure; these critical nodes are referred to as supernodes. To provide this application, the report type provided by the SOMO nodes is set to "sorted list," and the op provided by the SOMO nodes is set to "merge-sort." The supernodes provide reports that are available at various internal SOMO nodes, where the root SOMO node provides a complete report. These supernodes can accordingly act as indexing or routing hubs.

In another exemplary implementation, the SOMO technique can be used to discover a density map of node capacities. Such information can guide object placement in the DHT logical space, or can be used to migrate nodes from dense regions to less dense regions in the DHT logical space.

In another exemplary implementation, the SOMO mechanism can be configured to implement a publish-subscribe ("pub-sub") infrastructure.

In another exemplary implementation, the SOMO mechanism can create an image of a single resource pool comprised of DHT nodes forming the DHT logic space.

In another exemplary implementation, various mechanisms can be used to reduce or eliminate potential harm caused by malicious attack (where users attempt to access system resources for unauthorized and potentially destructive purposes). That is, the SOMO mechanism has been described above principally in a collaborative environment in which malicious attack by users is not expected. But safeguards can be taken if the SOMO tree structure is applied to systems in which malicious DHT nodes (corresponding to malicious user entities) may be present. For example, assume that denial-of-service attacks are mounted by relentlessly requesting the SOMO root node. One way to defend against this attack is by propagating copies throughout the P2P network, thereby stopping the attacks on the edge of the system. Alternatively, assume that there is a potential that the SOMO reports can be compromised in multiple ways on the paths used for information aggregation and/or dissemination. To guard against this, reports can be signed. Also, multiple SOMO internal nodes can generate redundant SOMO reports; various voting schemes can then be used to ascertain consensus and intruder detection. Alternatively, assume that there is a potential that an individual SOMO node can simply "cheat" or "lie" about its own status (e.g., pass inaccurate information about its status). Feedback processes among peers external to the SOMO mechanism can be used to establish trustworthiness of each SOMO node.

In another exemplary implementation, increased bandwidth can be provided at SOMO nodes near the top of the SOMO tree structure to accommodate heavy traffic loads in this part of the SOMO tree structure. This bandwidth concern can also be addressed, in part, by only gathering information that reflects a change in the system (e.g., by only gathering delta $\Delta$ information). Bandwidth can be further reduced by compressing the information that is transferred through the SOMO tree structure.

In another exemplary implementation, functionality is provided for locating a particular node using the SOMO mechanism. An application can then swap this particular SOMO node with the SOMO node which is currently hosting the SOMO root node. This allows the SOMO mechanism to optimize itself.

Still more advanced exemplary implementations can be built by providing algorithms that act on the metadata that is gathered from the SOMO tree structure, or which generate the information that is propagated down through the SOMO tree structure. In other words, more advanced techniques can be implemented by providing suitable functionality in the application layers (810, 910) shown in FIGS. 8 and 9, respectively.

C.3. Performance

The data overlay, and particularly the SOMO tree structure, provides an elegant and flexible mechanism for collecting or disseminating information. The mechanism is flexible in the sense that it specifies neither the type of information it should gather and/or disseminate, nor the operation invoked to process this information. In other words, SOMO operations are programmable. Further, using the abstraction of a data overlay (especially the host routing shortcut), the SOMO tree structure's performance is also insensitive to the particular implementation of the hosting DHT system.

In general, both the gathering and dissemination phases are $O(\log_k N)$ bounded, where N is the total number of entities in the P2P system (where the "Big O" notation is used here to express the efficiency of the SOMO algorithm). Each operation in SOMO involves no more than k+1 interactions, making it fully distributed. Further, data in the SOMO tree structure can be regenerated in $O(\log_k N)$ time. The SOMO tree self-organizes and self-heals in the same time bound.

More specifically, in one example, assume that the data gathering procedure described above is periodically executed at an interval of T. In this case, information is gathered from the SOMO leaf nodes and this information flows to its SOMO root node with a maximum delay of $\log_k N \cdot T$. This bound reflects the case in which flows between hierarchies are completely unsynchronized. If the upper SOMO nodes' requests immediately trigger the same actions in their children, then the latency can be reduced to $T + t_{hop} \cdot \log_k N$, where $t_{hop}$ is the average latency of a trip in the hosting DHT. The unsynchronized flow has latency bound of $\log_k N \cdot T$, whereas the synchronized version will be bounded by T in practice (e.g., 5 minutes in one exemplary implementation). Note that $O(t_{hop} \cdot \log_k N)$ is the absolute lower bound in one exemplary implementation. For 2M SOMO nodes and with k=8 and a typical latency of 200 ms per DHT hop, the SOMO root node will have a global view with a lag of 1.6 s. The dissemination scenario offers similar performance to that described above for the information gathering scenario.

D. Exemplary Computer Environment for Implementing One P2P Participant

The data overlay described above is a data structure that can be spread out over multiple machines and possibly over other infrastructure in a P2P system. Thus, each of the participants in the P2P system can be viewed as implementing a part of the data overlay. To achieve this effect, each participant can store the necessary code and data to create the data overlay and to interact with it. This code and data can be stored in the volatile and/or non-volatile memory of each participant (to be described below).

For example, FIG. 10 shows a high level view of one exemplary P2P participant 1000. This participant 1000 corresponds to a general purpose computer or server type computer 1002 and an associated display device 1004. However, the participant 1000 can be implemented using other kinds of computing equipment. For example, although not shown, the participant 1000 can include hand-held or laptop devices, set top boxes, mainframe computers, etc.

Exemplary computer 1002 includes one or more processors or processing units 1006, a system memory 1008, and a bus 1010. The bus 1010 connects various system components together. For instance, the bus 1010 connects the processor 1006 to the system memory 1008. The bus 1010 can be implemented using any kind of bus structure or combination of bus structures, including a memory bus or memory controller, a peripheral bus, an accelerated graphics port, and a processor or local bus using any of a variety of bus architectures. For example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1002 can also include a variety of computer readable media, including a variety of types of volatile and non-volatile media, each of which can be removable or non-removable. For example, system memory 1008 includes computer readable media in the form of volatile memory, such as random access memory (RAM) 1012, and non-volatile memory, such as read only memory (ROM) 1014. ROM 1014 includes an input/output system (BIOS) 1016 that contains the basic routines that help to transfer information between elements within computer 1002, such as during start-up. RAM 1012 typically contains data and/or program modules in a form that can be quickly accessed by processing unit 1006.

Other kinds of computer storage media include a hard disk drive 1018 for reading from and writing to a non-removable, non-volatile magnetic media, a magnetic disk drive 1020 for reading from and writing to a removable, non-volatile magnetic disk 1022 (e.g., a "floppy disk"), and an optical disk drive 1024 for reading from and/or writing to a removable, non-volatile optical disk 1026 such as a CD-ROM, DVD-ROM, or other optical media. The hard disk drive 1018, magnetic disk drive 1020, and optical disk drive 1024 are each connected to the system bus 1010 by one or more data media interfaces 1028. Alternatively, the hard disk drive 1018, magnetic disk drive 1020, and optical disk drive 1024 can be connected to the system bus 1010 by a SCSI interface (not shown), or other coupling mechanism. Although not shown, the computer 1002 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 1002. For instance, the readable media can store the operating system 1030, application programs 1032, other program modules 1034, and program data 1036.

The participant 1000 can include a variety of input devices. For instance, the participant 1000 includes the keyboard 1038 and a pointing device 1040 (e.g., a "mouse") for entering commands and information into computer 1002. The participant 1000 can include other input devices (not illustrated), such as a microphone, joystick, game pad, satellite dish, serial port, scanner, card reading devices, digital or video camera, etc. Input/output interfaces 1042 couple the input devices to the processing unit 1006. More generally, input devices can be coupled to the computer 1002 through any kind of interface and bus structures, such as a parallel port, serial port, game port, universal serial bus (USB) port, etc.

The participant 1000 also includes the display device 1004. A video adapter 1044 couples the display device 1004 to the bus 1010. In addition to the display device 1004, the participant 1000 can include other output peripheral devices, such as speakers (not shown), a printer (not shown), etc.

Computer 1002 operates in a peer-to-peer networked environment using logical connections to one or more remote computers, such as a remote computing device 1046. The remote computing device 1046 can comprise any kind of computer equipment, including another general purpose personal computer, portable computer, a server, etc. Remote computing device 1046 can include all of the features discussed above with respect to computer 1002, or some subset thereof.

Any type of network 1048 can be used to couple the computer 1002 with remote computing device 1046, such as the WAN 402 of FIG. 4, an intranet, a LAN, etc. The computer 1002 couples to the network 1048 via network interface 1050, which can utilize broadband connectivity, modem connectivity, DSL connectivity, or other connection strategy. Although not illustrated, the participant 1000 can provide wireless communication functionality for connecting computer 1002 with remote computing device 1046 (e.g., via modulated radio signals, modulated infrared signals, etc.).

Any of the above-identified stores in the computer 1002 can be used to store the code and data used to implement part of a data overlay, such as part of the SOMO tree structure.

To conclude, a strategy was described for building a data structure on top of a DHT in a P2P system. A specific hierarchical tree structure was specifically described for disseminating information into the P2P system and for collecting information from the P2P system.

Certain operations were described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

Further, a number of examples will be presented in this disclosure in the alternative (e.g., case A or case B). In addition, this disclosure encompasses those cases which combine alternatives in a single implementation (e.g., case A and case B), even though this disclosure may not expressly mention these conjunctive cases in every instance.

Generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for building a data overlay, comprising:
providing a distributed hash table (DHT) that governs the insertion and retrieval of objects into and from a peer-to-peer system, wherein the distributed hash table includes a logical space including a plurality of DHT nodes having an associated plurality of DHT zones;
building the data overlay as a data structure on top of the logical space of the distributed hash table by associating objects in the data structure with the DHT nodes, and by establishing links between the objects in the data structure;
wherein each link includes a first field that provides a hardwired pointer that points from a first object to a second object, and a second field that provides a soft-state pointer that points from the first object to a DHT node which hosts the second object;
wherein the building of the data overlay makes use of a first primitive for setting a reference that establishes a pointer to an object in the distributed hash table, a second primitive for returning an object referenced by a pointer, and a third primitive for deleting an object referenced by a pointer; and
wherein the data structure facilitates dissemination of information to the DHT nodes and gathering of information from the DHT nodes.

2. The method according to claim 1, wherein the data overlay has a topology of a tree, the tree having a plurality of tree nodes associated with respective DHT nodes, wherein each tree node has a respective tree node zone associated therewith which corresponds to a part of the logical space of the distributed hash table.

3. The method according to claim 2, wherein each tree node in the data overlay includes a key member which identifies a key associated with its respective tree node zone.

4. The method according to claim 3, wherein the key has a value that is a function of coordinates that identify the center of the respective tree node zone.

5. The method according to claim 2, wherein each tree node in the data overlay includes an operation member which defines an operation that is to be performed on data that is passed through the tree node.

6. The method according to claim 2, wherein each tree node in the data overlay includes a report member which defines a report type that is to be generated using the tree node.

7. The method according to claim 2, wherein the building of the data overlay comprises:
establishing a root tree node, the root tree node having a tree node zone corresponding to an entire span of the logical space of the distributed hash table.

8. The method according to claim 2, wherein the building of the data overlay comprises:
examining a tree node zone associated with a particular tree node to determine whether the tree node zone is smaller than or equal to a DHT zone associated with the particular tree node's hosting DHT node; and
adding a child node associated with the particular tree node if the examining determines that the tree node zone is not smaller than or equal to the associated DHT zone.

9. The method according to claim 8, further comprising repeating the examining and the adding for each tree node in the tree.

10. A computer readable store including machine readable instructions for implementing the building of objects in the data overlay according to the method of claim 8.

11. A computer readable store having stored thereon a data overlay produced according to the method of claim 1.

12. A computer readable store having stored thereon a data overlay having the topology of a tree produced according to the method of claim 2.

13. A computer readable store having stored thereon a data structure, comprising:
a logical space of a distributed hash table (DHT), including a plurality of DHT nodes having a plurality of associated DHT zones, wherein the distributed hash table governs the insertion and retrieval of objects into and from a peer-to-peer system;
a data overlay implemented as a data structure on top of the logical space of the distributed hash table logical space by associating objects in the data structure with the DHT nodes, and by establishing links between the objects in the data structure;
wherein each link includes a first field that provides a hardwired pointer that points from a first object to a second object, and a second field that provides a soft-state pointer that points from the first object to a DHT node which hosts the second object;
wherein building of the data overlay makes use of a first primitive for setting a reference that establishes a pointer to an object in the distributed hash table, a second primitive for returning an object referenced by a pointer, and a third primitive for deleting an object referenced by a pointer; and
wherein the data structure facilitates dissemination of information to the DHT nodes and gathering of information from the DHT nodes.

14. The distributed computer readable store of claim 13, wherein the data overlay has a topology of a tree, the tree having a plurality of tree nodes associated with respective DHT nodes, wherein each tree node has a respective tree node zone associated therewith which corresponds to a part of the logical space of the distributed hash table.

15. A method for passing data through a data overlay, comprising:
providing a distributed hash table (DHT) that governs the insertion and retrieval of objects into and from a peer-to-peer system, wherein the distributed hash table includes a logical space including a plurality of DHT nodes having a plurality of associated DHT zones;

building a data overlay as a data structure on top of the logical space of the distributed hash table by associating objects in the data structure with the DHT nodes, and by establishing links between the objects in the data structure;

wherein each link includes a first field that provides a hardwired pointer that points from a first object to a second object, and a second field that provides a soft-state pointer that points from the first object to a DHT node which hosts the second object;

wherein the building of the data overlay makes use of a first primitive for setting a reference that establishes a pointer to an object in the distributed hash table, a second primitive for returning an object referenced by a pointer, and a third primitive for deleting an object referenced by a pointer; and wherein the data overlay defines a plurality of interconnected nodes, and wherein the data structure facilitates dissemination of information to the DHT nodes and gathering of information from the DHT nodes; and routing data through the data overlay by passing the data through its interconnected nodes.

16. The method according to claim 15, wherein the data overlay has a topology of a tree, the tree having a plurality of tree nodes associated with respective DHT nodes, wherein each tree node has a respective tree node zone associated therewith which corresponds to a part of the logical space of the distributed hash table.

17. The method according to claim 16, wherein the routing of data through the data overlay includes gathering data from DHT nodes and passing the data up through the tree nodes to a root node of the tree.

18. The method according to claim 16, wherein the routing of data through the data overlay includes disseminating data from a root node of the tree, through the tree nodes, to the DHT nodes.

19. The method according to claim 16, wherein each tree node includes an operation member which defines an operation that is to be performed on data that is passed through the tree node.

20. A computer readable store including machine readable instructions for implementing the routing of data through the data overlay according to the method of claim 15.

21. A peer-to-peer system including a plurality of machines interacting in peer-to-peer fashion, comprising:

a logical space of a distributed hash table (DHT), including a plurality of DHT nodes having a plurality of associated DHT zones, wherein the distributed hash table governs the insertion and retrieval of objects into and from the peer-to-peer system; and a data overlay implemented as a data structure on top of the logical space of the distributed hash table by associating objects in the data structure with the DHT nodes, and by establishing links between the objects in the data structure wherein each link includes a first field that provides a hardwired pointer that points from a first object to a second object, and a second field that provides a soft-state pointer that points from the first object to a DHT node which hosts the second object;

wherein building of the data overlay makes use of a first primitive for setting a reference that establishes a pointer to an object in the distributed hash table, a second primitive for returning an object referenced by a pointer, and a third primitive for deleting an object referenced by a pointer;

wherein the data overlay uses services provided by the distributed hash table in routing from one object to another in the data structure, and wherein the data structure facilitates dissemination of information to the DHT nodes and gathering of information from the DHT nodes; and wherein the logical space of the distributed hash table and the data overlay are implemented in distributed fashion in respective stores of the plurality of machines in the peer-to-peer system.

22. The system according to claim 21, wherein the data overlay has a topology of a tree, the tree having a plurality of tree nodes associated with respective DHT nodes, wherein each tree node has a respective tree node zone associated therewith which corresponds to a part of the logical space of the distributed hash table.

23. The system according to claim 22, further including routing logic configured to route data through the data overlay by passing the data through the tree nodes.

24. The system according to claim 23, wherein the routing logic is configured to route the data through the data overlay by gathering data from DHT nodes and passing the data up through the tree nodes to a root node of the tree.

25. The system according to claim 23, wherein the routing logic is configured to route data through the data overlay by disseminating data from a root node of the tree, through the tree nodes, to the DHT nodes.

* * * * *